July 25, 1950 — L. R. HUTCHISON — 2,516,517
FISHING LINE REEL WITH BACKLASH CONTROL
Filed June 4, 1948
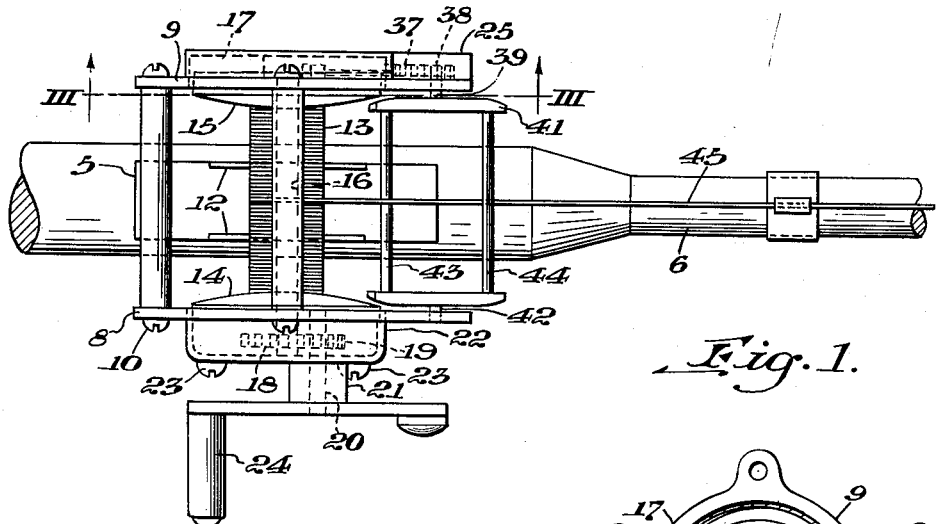
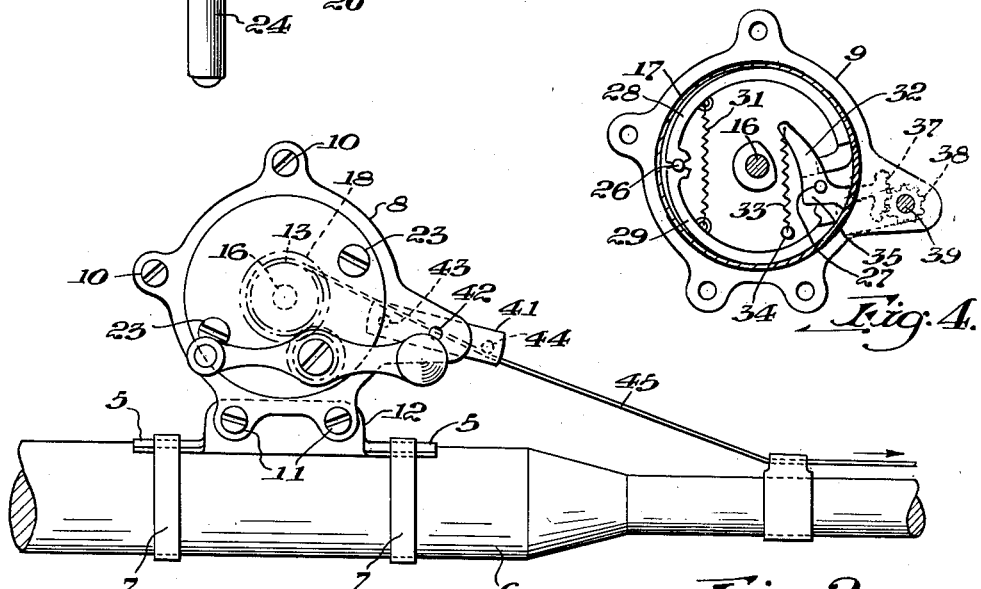
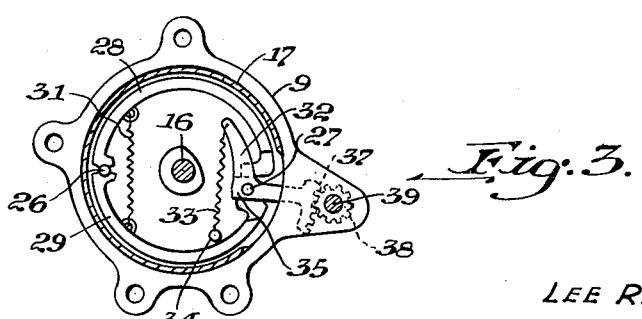
INVENTOR.
LEE R. HUTCHISON.
BY Archworth Martin
his ATTORNEY.

UNITED STATES PATENT OFFICE

2,516,517

FISHING LINE REEL WITH BACKLASH CONTROL

Lee R. Hutchison, Butler, Pa.

Application June 4, 1948, Serial No. 31,043

2 Claims. (Cl. 242—84.5)

My invention relates to reels for fishing lines, and more particularly to that type wherein a brake is used to normally hold the reel against free rotative movement when the line is taut, the brake being released through the exertion of a pulling force on the line, whereby tangling of the line through overrunning of the reel is avoided when the line is suddenly slackened or freed from a taut condition.

My invention has for its object the provision of an improved automatic brake which is of simple structure and which is more sensitive to changes in line tension than are various types of brake controlled reels heretofore employed.

The invention has the further advantage of providing great braking power without the necessity of using springs of as great tensional force as heretofore deemed necessary.

As shown in the accompanying drawing, Figure 1 is a plan view of the reel apparatus embodying my invention; Fig. 2 is an end view thereof; Fig. 3 is a view taken on the line III—III of Fig. 1, and Fig. 4 is a view similar to Fig. 3, but showing the brake in its applied position.

The apparatus comprises a mounting bar or base plate 5 which will be secured to a fishing rod 6 in any well known and convenient manner, as by straps 7. The reel has a frame that comprises end plates 8 and 9 that are detachably held in asembled relation by screws or bolts 10 and 11, the screws 11 also extending through ears 12 on the base plate 5.

The reel has a spool portion 13 having guide discs 14 and 15 rigidly secured thereto and journaled in the end plates 8 and 9 by a shaft 16. The guide disc or plate 15 has a flanged extension 17 that serves as a brake drum, as will be hereinafter explained. A gear wheel 18 is secured to the shaft 9 and is driven by a pinion 19 that is secured to a shaft 20 which is journaled in an extension 21 on a gear case 22 that is secured to the end plate 8 by screws 23. A crank 24 is secured to the shaft 20 for winding the line.

The end plate 9 has a cup-like portion 25 that serves as a brake housing. Pivot studs 26 and 27 are mounted on the end wall of the housing 25, the stud 27 being loosely carried thereby so that it can serve as a rock shaft. The stud 26 is fixedly mounted and serves as a fulcrum upon which brake shoes 28 and 29 will rock, for relative expansive and contractive movements into and out of frictional or braking engagement with the brake drum 17. A tension spring 31 yieldably holds the shoes 28—29 in contracted position and therefore out of braking engagement with the drum 17.

A bell-crank lever 32 is rigidly secured to the rock shaft 27 and a tension spring 33 connects one end of the lever to a fixed stud 34 that is mounted on the inner face of the housing 25. The lever 32 has an intermediate portion 35 of generally rectangular form, disposed between enlarged ends of the shoes 28—29, so that when the lever 32 is rocked in a counterclockwise direction by the spring 33 against the tension of the spring 31, the camming action of the boss 35 on the enlarged extremities of these shoes 28—29 will expand such shoes into braking engagement with the drum 17, to thereby frictionally hold the said drum and its spool 13 against rotation, as in Fig. 4. The spring 31 serves to hold the shoes out of rubbing engagement with the drum 17 when the cam lug 35 is in its neutral or release position (Fig. 3) with respect to the brake shoes.

The outer arm of the bell-crank lever has a segmental gear 37 formed thereon and in meshed engagement with a pinion 38 which is secured to a stud shaft 39. The shaft 39 is secured to a brake-operating lever 41 and is journaled in the end plate 9 to pivotally support the lever 41 at that end. The lever 41 at its other end has a stud shaft 42 that is journaled in the end plate 8. The lever 41 has cross bars 43 and 44 through which the fishing line 45 will be passed as shown in the drawing.

When there is no tension on the line 45, the spring 33 will hold the brake shoes 28—29 expanded to thereby prevent idle rotation of the reel. At this time, the line will be deflected somewhat by the bars 43 and 44 of the lever 41. When a pull is exerted on the outer end of the line, the lever 41 will be rocked in a counterclockwise direction to thereby rock the lever 32 to the position shown in Figs. 2 and 3, wherein the brake shoes 28—29 are contracted relative to the drum 17, so that the line can freely rotate. Upon release of line tension, the spring 33 will rock the lever 32 in a counterclockwise direction and thereby cause the camming shoulder 35 to spread the brake shoes against the tension of the spring 31 and thus apply braking force to the drum 17. This braking force is quite great relative to the amount of braking power applied, because of the extended braking area afforded by the shoes 28—29 on the drum.

I claim as my invention:

1. A fishing line reel, comprising a casing adapted for attachment to a fishing rod, a spool rotatably supported in the casing and having a brake drum, a pair of nearly semi-circular brake shoes disposed co-axially of the spool axis, for co-operative engagement with the drum, means pivotally supporting the shoes on the casing, at adjacent ends, a cam rotatably supported in the casing and engaging the free ends of the shoes, to effect pivotal movement of the shoes into engagement with the drum, a spring yieldably holding the shoes out of engagement with the brake drum when the cam is in its neutral position, a spring for moving the cam into position to move the shoes into braking engagement with the drum, in opposition to the first named spring, a lever for normally holding the fishing line deflected from a straight line, and a connection between the lever and the cam, for rotating the cam to neutral position against the tension of its spring, when the line is pulled to straighten it, to thereby release the shoes for movement from the brake drum by the first-named spring, the said connection comprising a crank-like extension on the cam and having segmentally-arranged rack teeth and a pinion on the lever having its teeth meshing with the rack teeth.

2. A reel structure for fishing lines, comprising a pair of end plates provided with means for connecting them to a fishing rod, a spool journaled between the end plates and extending through one of the plates, a crank having driving connection with one end of the spool for turning the same, a brake drum formed on the other end of the spool, a brake shoe movably supported by the adjacent end plate, in position for co-operative engagement with the brake drum, a camming member journaled in the said end plate, for moving the brake shoe into engagement with the drum, a spring yieldably holding the brake shoe in release position, a spring for normally holding the cam in its operative position, a segmentally-toothed rack carried by the cam, a pinion journaled in the end plate and meshing with the rack, a cover plate for the brake shoe, the cam and the pinion, and a lever connected with the pinion in position to normally hold the fishing line deflected from a straight line when the cam is in its operative position and the line is slackened, the lever being rocked to release the cam and the brake shoe, upon tightening of the line.

LEE R. HUTCHISON.

REFERENCES CITED

The following references are of record in the file of this patent:

UNITED STATES PATENTS

| Number | Name | Date |
|---|---|---|
| 1,836,869 | Pflueger et al. | Dec. 15, 1931 |
| 1,888,087 | Jacobsen | Nov. 15, 1932 |
| 1,892,541 | Smelser | Dec. 27, 1932 |
| 2,202,661 | Jeffery | May 28, 1940 |
| 2,326,645 | Hill | Aug. 10, 1943 |